March 13, 1934. O. C. RITZ-WOLLER 1,950,631
BRAKE AND CLUTCH PEDAL PAD
Filed March 10, 1932
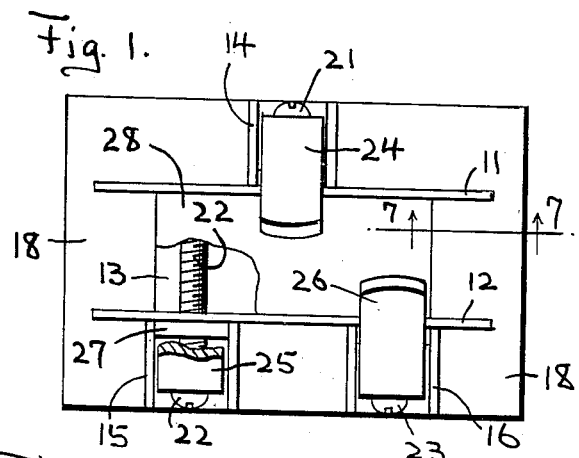
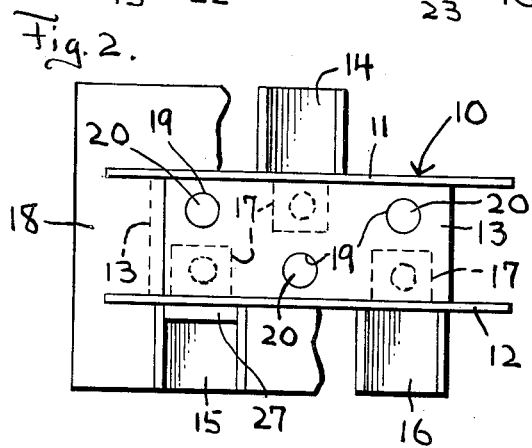
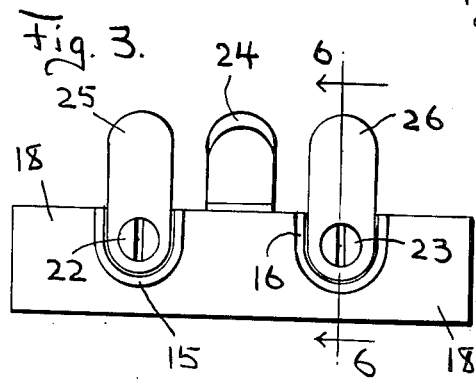
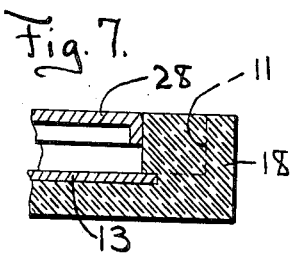
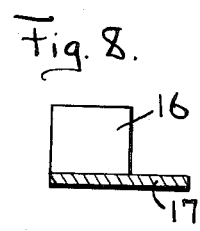
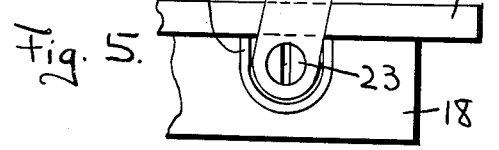
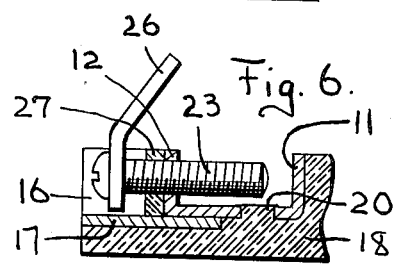
Inventor,—
Oliver C. Ritz-Woller,
By Fricke & DeBusk,
Attorneys.

Patented Mar. 13, 1934

1,950,631

UNITED STATES PATENT OFFICE 1,950,631

BRAKE AND CLUTCH PEDAL PAD

Oliver C. Ritz-Woller, Chicago, Ill.

Application March 10, 1932, Serial No. 597,949

8 Claims. (Cl. 74—81)

My invention relates to brake and clutch pedal pads and it has for its object the provision of a new and improved form and arrangement of parts for attaching the pad firmly in centered position on the face of a pedal. It is one of the objects of my invention to provide an improved arrangement by which the pad may be secured upon different sizes and shapes of pedal plates and in which the adjustable securing members are so arranged that the pad may be secured in close proximity to the face of the plate; by which the securing members may have a wide range of adjustment while being at all times underneath the pad so as to be out of sight and so as to be protected from contact with the shoe of the operator of the car, thus avoiding any possible danger that the foot of the operator might get caught so as to prevent free movement of the foot with respect to the pedal; by reason of which the clamping means may be capable of having a limited swinging movement longitudinally of the pad so as to enable one of the clamps to have a square face engagement with an obliquely disposed edge face portion of the pedal plate while at the same time having its outer face maintained in longitudinal alignment with the head of the adjusting screw bearing squarely thereon; in which the clamps and their adjusting screws are mounted in open transversely extending grooves in the bottom face or under side of the pad, with the arrangement such that the swinging movement of the clamps is limited by engagement of the clamps with the side faces of the grooves at any adjusted positions along such grooves; and by reason of which the construction may be so simplified as to be capable of being produced cheaply and readily with a minimum of machine operations thereon.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a rear face view of my improved pad, with a part of one of the clamps and a portion of a rear or bottom closure plate broken away for clearness of illustration;

Fig. 2 is a view similar to Fig. 1, but with the clamps removed, and with the rubber body material applied upon the metal frame-work at only one end portion of the device;

Fig. 3 is a side view of my improved pad;

Fig. 4 is a rear or bottom face view of my improved pad in position upon a pedal plate;

Fig. 5 is a fragmentary side view, showing one end portion of the device as shown in Fig. 4 in position upon a pedal;

Fig. 6 is a vertical cross section taken substantially at line 6—6 of Fig. 3;

Fig. 7 is a vertical section taken at line 7—7 of Fig. 1; and

Fig. 8 is a central sectional view through one of the metallic trough members of my improved device.

Referring now to the several figures of the drawing, in which corresponding parts are indicated by the same reference characters, 10 indicates a base member made of sheet metal in the form of a channel, in which the side portions 11 and 12 extend at their ends beyond the ends of the main plate portion 13, as is best shown in Fig. 2. At opposite sides of the channel member, I have provided trough members 14, 15, and 16, also formed of sheet metal a portion of which is extended at one end for providing a mounting arm 17 as is best shown in Fig. 8. The trough members 14, 15, and 16, are mounted in position by welding the arms 17 to the plate portion 13 of the channel on the front face thereof in such arrangement that the inner ends of the troughs are flush against the sides 11 and 12, as is clearly shown in Fig. 2.

With the channel member and the trough members rigidly connected together as shown in Fig. 2, a body 18 of rubber or other resilient cushioning material is molded or otherwise secured in position upon the front or top face of the plate 13 and the trough members 14, 15, and 16, and about the sides of such members so as to present a solid front or top face of a length slightly greater than the sides 11 and 12 of the channel member and of a width corresponding to the width of the frame-work so as to have the side faces of the body flush with the outer ends of the trough members. The several trough members, therefore, provide metallic linings for the respective recesses formed in the rear or bottom side of the cushioning pad. The rear or bottom face of the body 18 is flush with the rear or bottom edges of the plate portions 11 and 12 of the channel member, which in turn are flush with the rear or bottom edges of the opposite side portions of the troughs. As is clearly shown at the left in Fig.

2, the body material of rubber overlaps the plate 13 at the rear or bottom face of said plate between the side plate portions 11 and 12, serving to anchor the body material to the plate. For providing further assurance that the body material 18 will be retained strongly upon the metallic frame-work, I have provided a series of openings 19 through the plate 13 whereby short lugs 20 of body material are adapted to reinforce the bonding effect (see Fig. 6).

In the open grooves or recesses provided by the trough members 14, 15, and 16, I mount adjusting screws 21, 22, and 23, each of said screws having threaded engagement with the portions of the plates 11 and 12 which extend across the inner ends of the respective grooves or recesses thereby providing holding means for the screws. Upon the outer ends of the screws, I have mounted clamps 24, 25, and 26, the ends of said clamps extending into the grooves being of such size and shape as to be readily movable longitudinally of the grooves upon the rotation of the adjusting screws. As will be readily understood, the clamps are adapted to swing about the screws longitudinally of the pad, but such swinging movement is limited by engagement of the clamps with the side walls of the grooves, as is clearly shown in Fig. 5. The free ends of the clamps are diagonally disposed, extending inwardly and backwardly or downwardly so as to enable the clamps to have effective engagement with pedal plates of different thicknesses, as will be readily understood. In the arrangement shown, small blocks 27 of rubber are provided in the inner ends of the grooves, as is clearly shown in Figs. 2 and 6.

It will be noted that the screws are disposed within the grooves or recesses of the several trough members and that the screws are, therefore, above the plane of the bottom of the pad. Portions of the clamps are disposed within the recesses, the remaining portions of the clamps projecting downwardly so as to engage the edges of the pedal. The arrangement is such that the cushioning pad is clamped in close relationship to the pedal.

By rotating the screws 21, 22, and 23, the clamps 24, 25, and 26 are moved inwardly or outwardly along the trough members as necessary for tightening the clamps against the sides of a pedal plate in centered position thereon.

In the construction illustrated, a closure plate 28 is provided having a snug fit between the side plates 11 and 12 of the channel member, and extending substantially from end to end of the plate portion 13.

As is clearly shown in the drawing, the clamp 24 is located at about the middle point of the device at one side, while the clamps 25 and 26 are located in spaced relation at the opposite side of the device. That is to say, the clamp 24 at one side is located in the space between the clamps at the opposite side. The result is that such three clamps are adapted to secure my improved pad firmly in position upon a great variety of sizes and shapes of plate, with the body 18 centered both transversely and longitudinally of the pedal plate.

As is clearly shown in Figs. 4 and 5, when the device is secured in position on the tread face of a pedal plate such as the plate 29 of the pedal 30, the clamps are adapted to swing slightly longitudinally of the device so as to cause their inner faces to have a snug fit against the edge face of the pedal plate while at the same time maintaining their outer faces in square engagement with the heads of the adjusting screws.

By the use of my improved construction, I am enabled to provide an effective cushioning pad device which is adapted to fit the tread plates of different makes of car, with provision in each instance for the pad being very securely clamped in position. The clamping means in each instance is located behind or below the tread face of the pad so as to be out of sight and so as to avoid any possibility of trouble by reason of such parts becoming entangled with the clothing of the driver of the car. The arrangement is such that the device can be very readily applied to a pedal and can as easily be again removed if desired, the clamps being held in approximately their operative position by reason of being mounted in the backwardly or downwardly open grooves or recesses. The construction is such that the device can be produced very cheaply and readily with a minimum of machine work thereon, and can be very easily and quickly assembled. The arrangement is such that the device is capable of standing up under long continued use without undue deterioration.

While I prefer to employ the form of device as shown in my drawing, it is to be understood that my invention is not limited thereto, except so far as the claims may be so limited by the prior art, it being understood that changes might well be made in the form and arrangement without departing from my invention.

I claim:

1. In a pedal pad, a pad portion having a transverse recess therein, a plate forming guides along the opposite sides of said recess, a jaw slidably movable along said guides and having a gripping portion extending away from said recess, means within said recess for adjusting said jaw, and other gripping means adjustable relative to said plate and cooperating with said jaw to clamp said pad portion to a pedal.

2. In a device of the type described, the combination of a pad having an open recess in its under side, means fixed to said pad and providing a holding portion extending across said recess, a jaw having a portion movable along and in said recess, screw means extending longitudinally within said recess above the plane of the bottom of said pad and cooperating with said jaw and holding portions for moving the jaw in said recess, and other gripping means cooperable with said jaw to clamp the device to a pedal.

3. In a device of the type described, the combination of a resilient cushioning pad having open recess means in its under face at each side thereof, means fixed to said pad and providing holding means extending across said recess means, a plurality of jaws each having a portion movable along and in said recess means, and screw means extending longitudinally within said recess means above the plane of the bottom of said pad and cooperating with said jaw portions and said holding means respectively for moving the jaws in said recess means for clamping the device to a pedal.

4. In a device of the type described, the combination of a pad having an open recess in its under side, metallic means fixed to said pad and shaped to provide a metallic lining for said recess, a holding member extending across said recess, a jaw having a portion movable along and in said recess, screw means extending longitudinally within said recess above the plane of the bottom of said pad and cooperating with said jaw and said holding member for moving the jaw in said recess, and other gripping means cooperable with said jaw to clamp the device to a pedal.

5. In a device of the type described, the combination of a resilient cushioning pad having open recess means in its under face at each side thereof, metallic means fixed to said pad and shaped to provide a metallic lining for said recess means, holding means fixed to said pad and extending across said recess means, a plurality of jaws each having a portion movable along and in said recess means, and screw means extending longitudinally within said recess means above the plane of the bottom of said pad and cooperating with said jaw portions and said holding means respectively for moving the jaws in said recess means for clamping the device to a pedal.

6. In a device of the type described, the combination of a pad having an open recess in its under side, metallic means fixed to said pad and having a holding portion extending across said recess, a jaw member having a portion movable along and in said recess, screw means extending longitudinally within said recess above the plane of the bottom of said pad and cooperating with said jaw and holding portions for moving the jaw in said recess, and other gripping means cooperable with said jaw to clamp the device to a pedal, said metallic means also having guide members disposed along the sides of said recess and adapted to be engaged by the sides of said jaw member for limiting sidewise movement of the jaw member.

7. In a pedal pad, a resilient pad portion having a transverse recess therein, a retainer plate providing a lining for said recess, a jaw having a portion movable along and within said recess, rotary means extending longitudinally within said recess and cooperating with said jaw portion to move said jaw along said recess, and other means cooperable with said jaw to clamp said pad portion to a pedal.

8. In a pedal pad, a resilient pad portion, a retainer plate permanently attached to said pad portion having a plurality of recesses therein, a series of jaws slidable along said recesses and having adjusting and grip portions projecting respectively above and below the plane of said plate, and rotary means extending into said recesses and cooperating with said jaw adjusting portions to move said jaws along said recesses.

OLIVER C. RITZ-WOLLER.